United States Patent
Tong et al.

(10) Patent No.: US 10,540,800 B2
(45) Date of Patent: *Jan. 21, 2020

(54) FACIAL GESTURE DRIVEN ANIMATION OF NON-FACIAL FEATURES

(71) Applicant: Intel Corporation, Santa Clara, CA (US)

(72) Inventors: Xiaofeng Tong, Beijing (CN); Qiang Eric Li, Beijing (CN); Yangzhou Du, Beijing (CN); Wenlong Li, Beijing (CN); Johnny C. Yip, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,222

(22) Filed: Oct. 23, 2017

(65) Prior Publication Data

US 2018/0204368 A1 Jul. 19, 2018

Related U.S. Application Data

(63) Continuation of application No. 14/779,535, filed as application No. PCT/CN2014/094622 on Dec. 23, 2014, now Pat. No. 9,799,133.

(51) Int. Cl.
*G06T 13/40* (2011.01)
*G06T 7/246* (2017.01)
(Continued)

(52) U.S. Cl.
CPC ............. *G06T 13/40* (2013.01); *G06F 3/012* (2013.01); *G06F 3/017* (2013.01); *G06T 1/0007* (2013.01);
(Continued)

(58) Field of Classification Search
CPC ................. G06T 13/40; G06T 13/00; G06T 2207/30201; G06T 2213/12;
(Continued)

(56) References Cited

U.S. PATENT DOCUMENTS 6,477,239 B1 * 11/2002 Ohki .................. G09B 21/009
348/14.01
9,824,502 B2  11/2017 Tong et al.
(Continued)

FOREIGN PATENT DOCUMENTS

CN   101149840 A   3/2008
CN   101354795 A   1/2009
(Continued)

OTHER PUBLICATIONS

Supplementary European Search Report issued in European Patent Application No. 14908703, dated Jul. 27, 2018, 12 pages.
(Continued)

*Primary Examiner* — Haixia Du
(74) *Attorney, Agent, or Firm* — Grossman, Tucker, Perreault & Pfleger, PLLC (57) ABSTRACT

Examples of systems and methods for non-facial animation in facial performance driven avatar system are generally described herein. A method for facial gesture driven body animation may include capturing a series of images of a face, and computing facial motion data for each of the images in the series of images. The method may include identifying an avatar body animation based on the facial motion data, and animating a body of an avatar using the avatar body animation.

15 Claims, 5 Drawing Sheets

(51) Int. Cl.
　　　*G06F 3/01*　　　　(2006.01)
　　　*G06T 1/00*　　　　(2006.01)
(52) U.S. Cl.
　　　CPC .... *G06T 7/246* (2017.01); *G06T 2207/10004* (2013.01); *G06T 2207/30201* (2013.01)
(58) Field of Classification Search
　　　CPC ..... G06T 2200/24; G06T 13/20; G06T 13/80; G06T 2213/04; G06T 2213/08; G06T 15/205; G06T 2210/44; G10L 15/25; H04N 21/44008; H04N 7/157; H04N 21/8146; G09B 21/009; A63F 2300/6607; G06K 9/00315; G06K 9/00268; G06K 9/00221; H04M 1/72544
　　　See application file for complete search history.

(56)　　　　　　　References Cited

U.S. PATENT DOCUMENTS

| | | | |
|---|---|---|---|
| 2003/0182122 | A1 | 9/2003 | Horinaka et al. |
| 2004/0179037 | A1 | 9/2004 | Blattner et al. |
| 2005/0162419 | A1 | 7/2005 | Kim et al. |
| 2005/0271252 | A1 | 12/2005 | Yamada |
| 2006/0023923 | A1 | 2/2006 | Geng et al. |
| 2006/0294465 | A1 | 12/2006 | Ronen et al. |
| 2008/0267459 | A1 | 10/2008 | Nakada et al. |
| 2010/0082345 | A1 | 4/2010 | Wang et al. |
| 2010/0146052 | A1 | 6/2010 | Pare et al. |
| 2010/0302252 | A1 | 12/2010 | Petrovic et al. |
| 2011/0007079 | A1 | 1/2011 | Perez et al. |
| 2011/0007142 | A1* | 1/2011 | Perez ............... G06F 3/017 348/77 |
| 2011/0064388 | A1 | 3/2011 | Brown et al. |
| 2011/0292051 | A1 | 12/2011 | Nelson et al. |
| 2012/0079377 | A1 | 3/2012 | Goossens |
| 2012/0079378 | A1 | 3/2012 | Goossens |
| 2012/0139830 | A1 | 7/2012 | Hwang et al. |
| 2013/0235045 | A1 | 9/2013 | Corazza et al. |
| 2013/0286161 | A1 | 10/2013 | Lv et al. |
| 2014/0026102 | A1 | 1/2014 | Kinn |
| 2014/0085293 | A1 | 3/2014 | Konoplev et al. |
| 2014/0176662 | A1* | 6/2014 | Goodman ............ H04W 4/21 348/14.07 |
| 2014/0198121 | A1 | 7/2014 | Tong et al. |
| 2014/0362091 | A1 | 12/2014 | Bouaziz et al. |
| 2015/0332088 | A1 | 11/2015 | Chembula |
| 2016/0328875 | A1 | 11/2016 | Fang et al. |
| 2016/0328876 | A1 | 11/2016 | Tong et al. |
| 2016/0328886 | A1 | 11/2016 | Tong et al. |
| 2016/0364895 | A1 | 12/2016 | Santossio et al. |
| 2017/0118145 | A1 | 4/2017 | Aittoniemi et al. |

FOREIGN PATENT DOCUMENTS

| | | |
|---|---|---|
| CN | 101499128 A | 8/2009 |
| CN | 102157007 A | 8/2011 |
| CN | 102934144 A | 2/2013 |
| CN | 103093490 A | 5/2013 |
| CN | 102509333 A | 6/2015 |
| TW | 201303747 A | 1/2013 |
| WO | 2002-009040 A1 | 1/2002 |
| WO | 2014-194439 A1 | 12/2014 |
| WO | 2016-101124 A1 | 6/2016 |
| WO | 2016-101131 A1 | 6/2016 |
| WO | 2016-101132 A1 | 6/2016 |

OTHER PUBLICATIONS

Welbergen et al., "Real Time Animation of Virtual Humans: A Trade-off Between Naturalness and Control", Computer Graphics Forum, vol. 29, No. 8, Sep. 9, 2010, XP055495582, GB, ISSN: 0167-7055, DOI: 10.1111/j.1467-8659.2010.01822, 25 pages.

Zhang et al., "Dynamic Facial Expression Analysis and Synthesis With MPEG-4 Facial Animation Parameters", IEEE Transactions on Circuits and Systems for Video Technology, Institute of Electrical and Electronics Engineers, USA., vol. 18, No. 10, Oct. 1, 2008, XP011231744, ISSN: 1051-8215, DOI: 10.1109/TCSVT.2008. 928887, 14 pages.

Badler et al., "Representing and Parameterizing Agent Behaviors", Computer Animation, 2002, Proceedings of the Computer Animation, Jun. 19-21, 2002, Piscataway, NJ, USA, IEEE, Jun. 19, 2002, XP010592573, ISBN: 978-0-7695-1594-6, 11 pages.

Kocon Ed-Didimo et al., "Idle Motion Synthesis of Human Head and Face in Virtual Reality Environment", Sep. 25, 2012, Medical Image Computing and Computer-Assisted Intervention—MICCAI 2015 : 18th International Conference, Munich, Germany, Oct. 5-9, 2015; Proceedings; [Lecture Notes in Computer Science; Lect. Notes Computer], Springer International Publishing, CH, XP047039221, ISSN: 0302-9743, ISBN: 978-3-642-16065-3, 8 pages.

European Search Report issued in European Patent Application No. 18180580.5, dated Sep. 10, 2018, 14 pages.

International Preliminary Report on Patentability in related PCT/CN2014/094622, dated Jun. 27, 2017, 7 pages.

U.S. Appl. No. 14/779,491, Final Office Action dated Mar. 22, 2017, 23 pages.

U.S. Appl. No. 14/779,491, Non Final Office Action dated Nov. 10, 2016, 23 pages.

U.S. Appl. No. 14/779,501, Final Office Action dated May 5, 2017, 24 pages.

U.S. Appl. No. 14/779,501, Non Final Office Action dated Dec. 9, 2016, 35 pages.

Ghimire, et al., "Geometric Feature-Based Facial Expression Recognition in Image Sequences Using Multi-Class AdaBoost and Support Vector Machines", Sensors, (2013), pp. 7714-7734.

Kim, et al., "Facial Feature Extraction Using PCA and Wavelet Multi-Resolution Images", Proceedings of the Sixth IEEE International Conference on Automatic Face and Gesture Recognition (FGR'04), (2004), 6 pages.

Sucontphunt, et al., "Interactive 3D Facial Expression Posing through 20 Portrait Manipulation," Graphics Interface Conference, (2008), pp. 177-184.

International Application Serial No. PCT/CN2014/094602, International Search Report dated Sep. 22, 2015, 4 pages.

International Application Serial No. PCT/CN2014/094602, Written Opinion dated Sep. 22, 2015, 4 pages.

International Application Serial No. PCT/CN2014/094618, International Search Report dated Sep. 24, 2015, 4 pages.

International Application Serial No. PCT/CN2014/094618, Written Opinion dated Sep. 24, 2015, 4 pages.

International Application Serial No. PCT/CN2014/094622, International Search Report dated Sep. 29, 2015, 4 pages.

International Application Serial No. PCT/CN2014/094622, Written Opinion dated Sep. 29, 2015, 3 pages.

Zhang, Jie, et al., "Coarse-to-Fine Auto-encoder Networks (CFAN) for Real-time Face Alignment", Computer Vision—ECCV 2014: Proceedings of 13th European Conference, Zurich, Switzerland, Part II, Springer International Publishing, (2014), pp. 1-16.

Xiong, Xuehan, et al., "Supervised Descent Method and its Applications to Face Alignment", IEEE Conference on Computer Vision and Pattern Recognition (CVPR), (Jun. 2013), pp. 8 pages.

Wang, Heng, et al., "Action Recognition by Dense Trajectories", IEEE Conference on Computer Vision & Pattern Recognition, (2011), pp. 3168-3176.

"ITunes Preview: Face Q", by Shenzhen Lianmeng Technology Co.Ltd., [Online]. Retrieved from the Internet: <URL: https://itunes.apple.com/us/app/myotee-lian-meng-katong./id764976183?m>, (Accessed on: May 12, 2016), 2 pages.

"ITunes Preview: Talking Tom Cat 2", by Outfit7 Limited, [Online]. Retrieved from the Internet: <URL: https://itunes.apple.com/us/app/talking-tom-cat-2/id421997825?mt=8>, (Accessed on: May 12, 2016), 2 pages.

Cao, Chen, et al., "Displaced Dynamic Expression Regression for Real-time Facial Tracking and Animation", ACM Transactions on Graphics (TOG)—Proceedings of ACM SIGGRAPH, 33(4), (Jul. 2014), 10 pages.

(56) References Cited

OTHER PUBLICATIONS

Garrido, Pablo, et al., "Reconstructing Detailed Dynamic Face Geometry from Monocular Video", ACM Transactions on Graphics (TOG)—Proceedings of ACM SIGGRAPH Asia, 32(6), (Nov. 2013), 10 pages.
Ruiz, Jamie, et al., "DoubleFlip: A Motion Gesture Delimiter for Mobile Interaction", Proceedings of the SIGCHI Conference on Human Factors in Computing Systems, (May 2011), 4 pages.
Notice of Allowance issued in U.S. Appl. No. 14/779,535, dated Jun. 15, 2017, 8 pages.
Office Action issued in U.S. Appl. No. 14/779,535, dated Dec. 27, 2016, 33 pages.

* cited by examiner

FACIAL GESTURE DRIVEN ANIMATION OF NON-FACIAL FEATURES

BACKGROUND

Users of mobile devices have access to text messaging, image messaging, video, and phone calling. But for those users, expressing emotions or body animations in messages is difficult. An avatar to mimic the face of a user is used to simulate human expression of the user. However, such avatars are not able to support body animations. Other animation systems may support body animations but cannot animate the face of an avatar.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Animating non-facial components of an avatar may be triggered by facial motion data. Non-facial components of an avatar may include body animations, such as arms, legs, hands, feet, etc.; non-human body parts such as a tail, wings, horns, antlers, hooves, fins, etc.; or apparel, such as clothing, armor, gloves, hats, shoes, boots, etc. A body animation may correspond to a predetermined facial expression and may be animated in combination with a face of an avatar.

Figure 1:
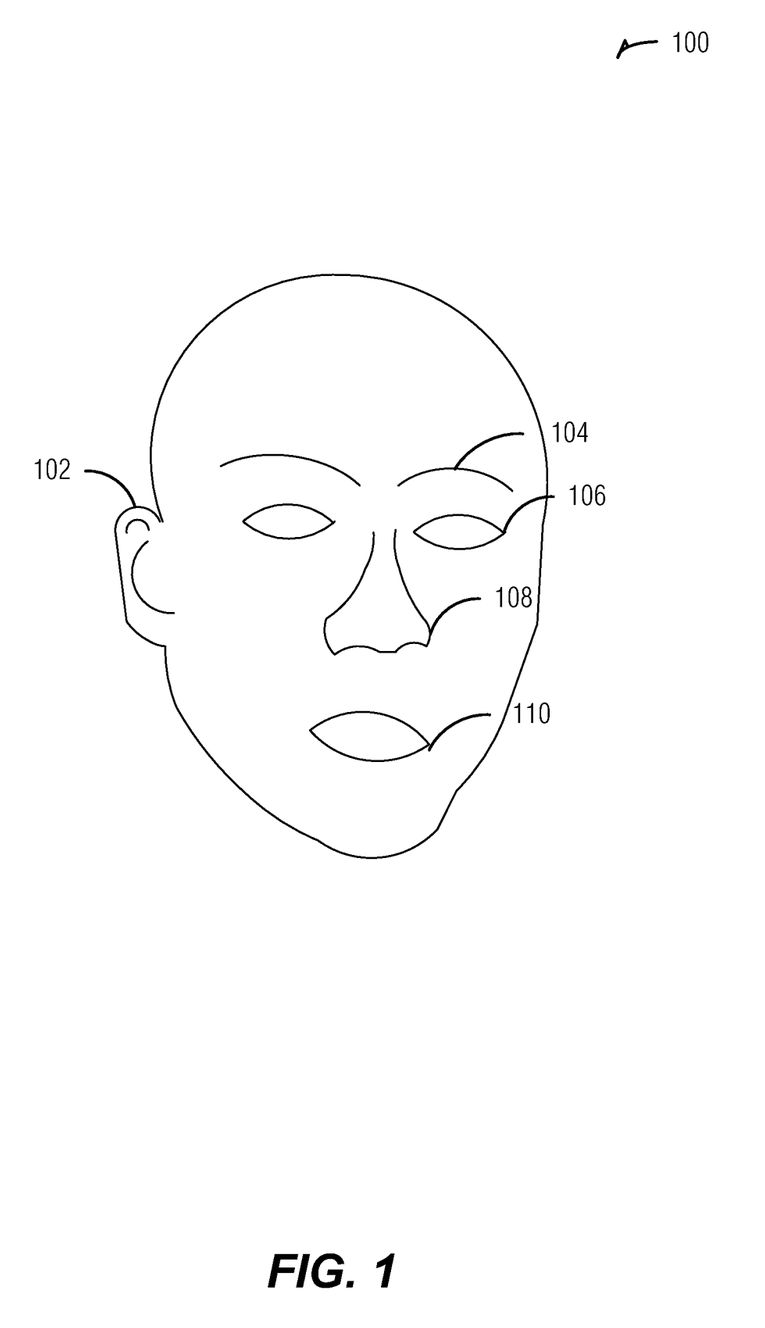
FIG. 1 is a diagram illustrating a face with landmark points, according to an embodiment.

FIG. 1 is a diagram illustrating a face 100 with landmark points 104, 106, 108, and 110, according to an embodiment. The face 100 includes multiple landmark points, including points on an ear 102, an eyebrow 104, an eye 106, a nose 108, and a mouth 110. In an example, the landmark points (e.g., 104, 106, 108, and 110) may be used to animate a body of an avatar. For example, a specific move pattern of a landmark, such as the eyebrow 104 raising a specified distance, may be facial motion data. The facial motion data may be recognized and detected as a specific move pattern of the landmark points (e.g., 104, 106, 108, and 110), and the facial motion data may be mapped to an avatar body animation, such as the eyebrow 104 raising mapped to a tail wagging. The trigger for animating the avatar body animation may be solely due to the detected sequence of facial expressions or movement of landmark points (e.g., 104, 106, 108, and 110), or may use additional factors, such as a user indication to enter a body animation mode.

Figure 2:
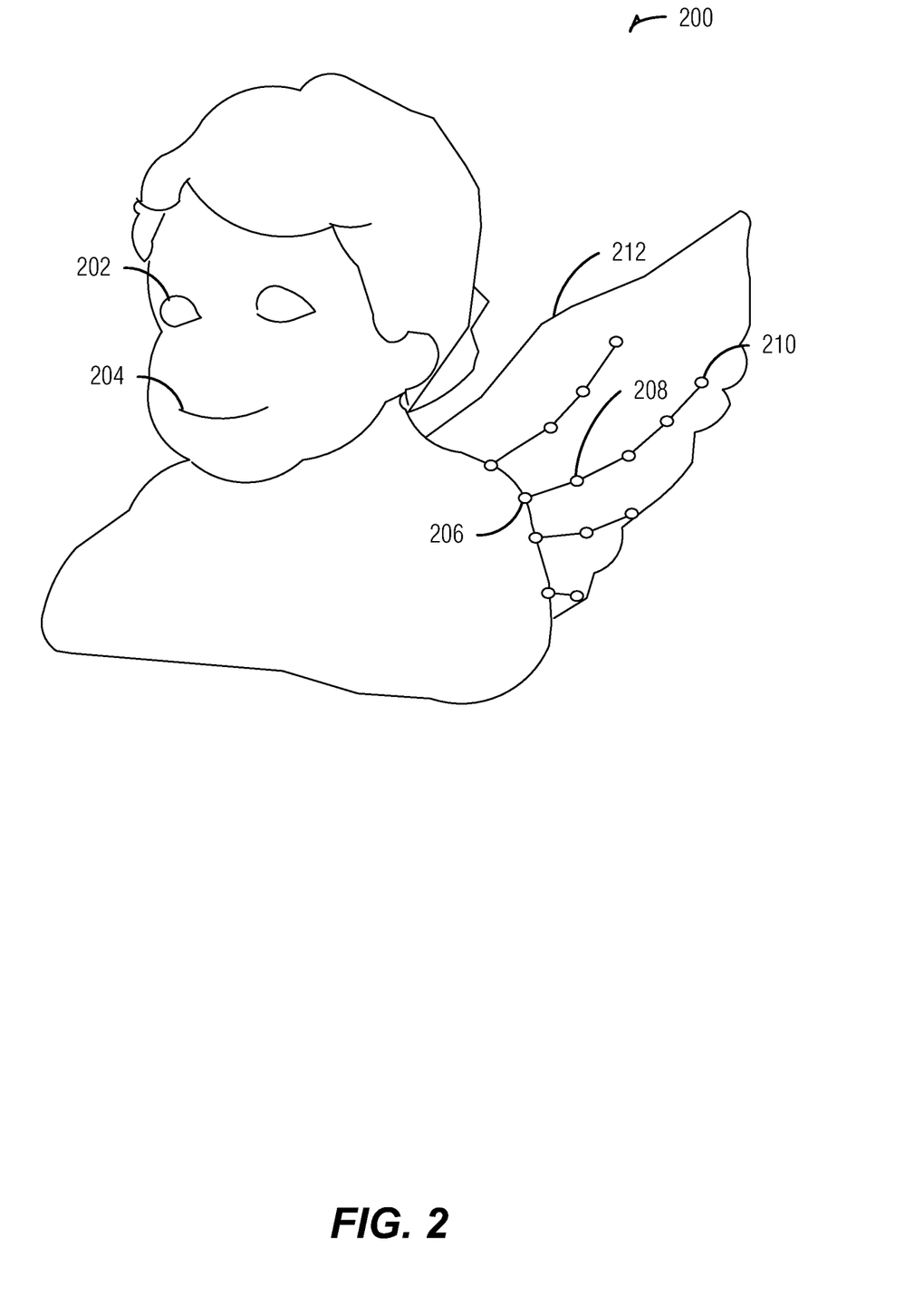
FIG. 2 is a diagram illustrating a face and body of an avatar for animating, according to an embodiment.

FIG. 2 is a diagram illustrating a face and body of an avatar 200 for animating, according to an embodiment. The avatar 200 includes facial features for animating, such as an eye 202 and a mouth 204. The avatar 200 includes a body with parts such as a wing 212. The wing 212 includes bone and joint positions to facilitate animation. One portion of the wing 212 includes a base joint 206, a middle joint 208, and an end joint 210. The animation or motion of end joint 210 may be defined relative to the animation or motion of middle joint 208, which may be defined relative to the animation or motion of base joint 206. The animation or movement of base joint 206 may be defined relative to an origin, or without relativity in an absolute coordinate system. The eye 202 or mouth 204 may be animated in a face animation and the base 206, middle 208, or end joints 210 may be animated in a body animation. An eye 202 or mouth 204 face animation and a joint body (e.g., 206, 208, or 210) animation may be animated concurrently in a blended animation, separately, or sequentially. The joint animations may be based on the face animations, or the face animations may be based on the joint animations.

Figure 3:
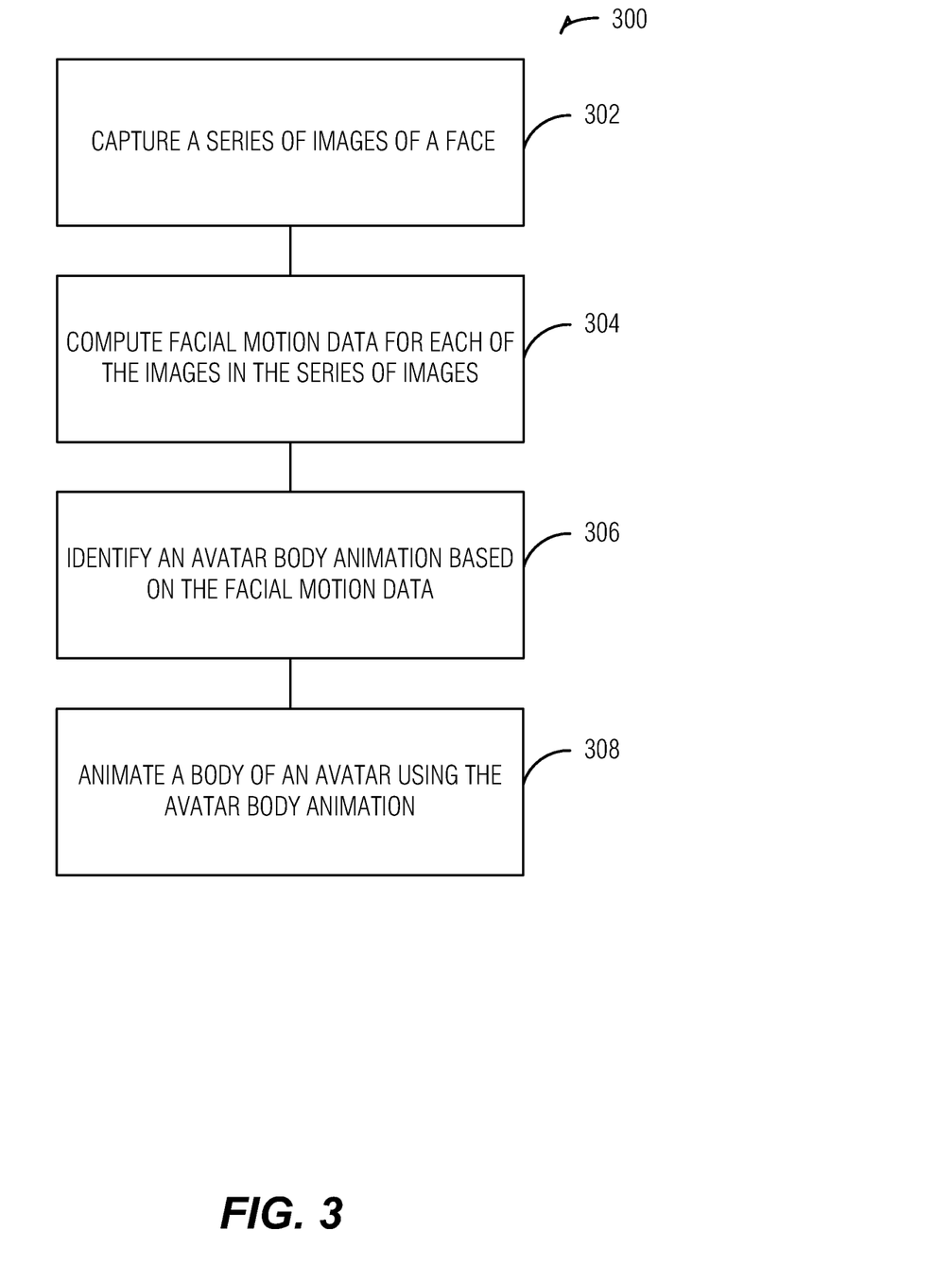
FIG. 3 is a flowchart illustrating a method for animating a body of an avatar, according to an embodiment.

FIG. 3 is a flowchart illustrating a method 300 for animating a body of an avatar, according to an embodiment. The method 300 may include an operation 302 to capture a series of images of a face, such as with an image capture device (e.g., a camera or other imaging device). In an example, the method 300 includes an operation 304 to compute facial motion data for each of the images in the series of images. The facial motion data may include movement or poses of a user's face that may correspond to an avatar body animation. A movement or pose of the user's face may be mapped to an avatar body animation.

The method 300 may include an operation 306 to identify an avatar body animation based on the facial motion data. In an example, the method 300 includes determining movement of a specified landmark point on the face and identifying the avatar body animation based on the movement of the specified landmark. For example, the specified landmark may include a point on the face such as a point on the eye, nose, mouth, etc. An avatar body animation may be mapped to a specified landmark's movement in a predetermined direction or path. In another example, an avatar body animation is mapped to movement of a set of landmarks, such as landmarks on an eyelid closing. The movement of the specified landmark may include a user defined movement of the specified landmark. The user defined movement may include a selection of a predefined movement, or a user created movement. For example, the user may define a series of eye blinks or select smiling from a list of predefined movements. The user defined movement may be mapped to an avatar body animation, and the mapping may be predetermined or selected by a user. The avatar body animation may be a user defined avatar body animation. For example, a user may select an avatar body animation, an avatar body part, or an animation to be done on a random body part, or the user may create an avatar body animation. The specified landmark may include landmarks such as those shown in FIG. 1.

In another example, the method 300 may include determining a lack of movement of the face in the series of images and identifying the avatar body animation based on the lack of movement. For example, if a specified period of time has elapsed and the face has not moved, the avatar body animation may be triggered. Animating the body of the avatar based on a lack of movement of the face may be done without user intent to initiate a body animation. Other types of body animations described herein are be triggered by movement of a user's facial features, representing an action by a user, (although the movement may be unintentional). Animating the body of the avatar based on a lack of movement differs from these other types of body animations in that it does not use an action of a user, but rather inaction of a user (although the inaction may be deliberate). As these examples show body animations may be triggered in different circumstances by a user's deliberate or unintentional, action or inaction. In an example, triggering a body animation based on a lack of movement may include triggering the body animation to draw a user's attention to the avatar. This example allows the user to be reminded of the presence of the avatar while still allowing the avatar face to mimic the user.

The method 300 may include an operation 308 to animate a body of an avatar using the avatar body animation, wherein the body of the avatar includes a plurality of parts of the avatar connected to an avatar face. For example, the body of the avatar may include the head supporting the avatar face, arms, legs, feet, hands, a tail, a horn, wings, etc. The body of the avatar may include structural components of the avatar without including facial features. For example, the facial features may move independently of an animation of the head, which may be considered part of the body of the avatar. In this example, though the facial features may move independently of an animation of the head, they may remain dependent of the animation of the head. For example, eyes may blink, but may remain in the same place on the head relative to a nose, ears, etc. and the head may shake side to side independently of the eyes blinking. The body of the avatar may exclude an avatar face. The avatar face may include features on a head that may move independently of the head.

In an example, the method 300 may include receiving a user indication to enter a body animation mode before animating the body of the avatar, and identifying the avatar body animation may include identifying the avatar body animation after receiving the user indication. The user indication may include a detected facial motion from the facial motion data without any other user input. The user indication may include a user selecting a button or drop down menu item to enter the body animation mode using a touchscreen or input device. In another example, the method 300 may include animating an avatar face using the facial motion data. Animating the avatar face may include mimicking facial motion from the face.

In an example, the method 300 may include animating the body of the avatar using the avatar face animation. For example, body animations may be selected using the avatar face animation, such as wagging a tail when the avatar smiles, clapping hands when the avatar looks up, animating legs to kick a ball when the avatar face moves an ear, etc. The body animations and avatar face animations may correspond in a way that seems related, such as wagging the tail when the avatar smiles, or may not correspond in a way that seems related, such as flapping wings when eyebrows are raised. In another example, the avatar face may be animated based on properties of the body animation. This example may include animating the avatar face based on speed, duration, size, etc., of the body animation. The method 300 may include animating the body of the avatar based on properties of the facial animation. For example, the body of the avatar may flap wings harder when a facial animation has a growing smile. Other examples of facial animations may include repetition, movement, type of facial animation, size of facial animation, or the like. The body animations may be directly or inversely proportional to movement, size, or the like of the facial animations.

In an example, animating the body of the avatar may include animating a first part of the body and animating a second part of the body relative to the first part of the body. For example, a middle portion of a wing may be animated relative to a base portion of the wing. The animation of the second part of the body may use a first weighted value. The first weighted value may include a coefficient to reduce or increase the movement of the second part of the body so that it moves a desired absolute amount but a shorter relative amount. For example, if only the middle portion of a wing moved, it may not need to be weighted. When the middle portion of the wing is attached to a base portion of the wing and the base portion of the wing moves, the middle portion of the wing will also move with the base portion. To move the middle portion of the wing relative to the base portion of the wing, the middle portion of the wing will be moved, but to a lesser extent relative to the base portion to arrive at the same place as if the middle portion of the wing moved independently.

Animating the body of the avatar may include animating a third part of the body relative to the second part of the body using a second weighted value, wherein the second weighted value is less than the first weighted value. For example, an end of the wing may be moved relative to the middle of the wing, which in turn may be moved relative to the base of the wing. The tip of the wing may move relative to the middle of the wing and the base of the wing and may need to be weighted less than the middle portion of the wing. In an example, the tip of the wing may move farther than the middle of the wing to simulate the wing flapping and may have a weighted value less than the middle of the wing to accomplish this movement.

In another example, a limb, such as an arm or leg, may be moved and a weighted value may be used to accurately animate a hand or foot. An arm may be animated to rise, and because a hand is attached to the arm, the hand will also rise in the animation. To animate the hand to rise relative to the arm (e.g., to animate a hand waving), the hand will rise more than the arm relative to a stable point on a body the arm is attached to, The hand may rise less than if the arm did not also rise since the hand rises with the arm. For example, if the hand rises to a vertical with fingers pointed up in an animation from a horizontal, without the arm also rising, the hand will move 90 degrees relative to the stable point on the body. If the arm (e.g., upper arm and lower arm together) rises 30 degrees, the hand may also rise that 30 degrees. In this example, the hand will rise 60 degrees independently of the arm (e.g., relative to the arm) to reach the full 90 degrees relative to the stable point. The weighted value in this case may include a ratio, such as the ratio of the degrees the hand rises independently of the arm to the degrees relative to the stable point (e.g. $60/90$ or $2/3$). Without the weighted value, the hand may overextend by rising 90 degrees when the arm rises 30 degrees, which may result in an incorrect position for the hand (e.g., the hand may rise to 120 degrees relative to the stable point).

In an example, an avatar may be rendered and animated using facial recognition, facial animation, and body animation. Facial recognition may include capturing a face of a user with an image capture device, such as a camera, detect facial motion data from the captured images, and convert the captured images to blendshape weights. A blendshape may include values for individual parts in a face or body for animation. Animation may be done for a face and body of an avatar using linear shape blending of the blendshape. In an example, an equation may be used, such as:

$$B_* = T \cdot \left( B_0 + \sum_{i=0}^{n} (\alpha_i \cdot \Delta B_i) \right)$$

Where, $B_*$ is an animated model with face and head animation, $B_0$ is a base model, $\Delta B_i$ is the i-th facial blendshape (which are offset to the base model), $(B_0 + \Sigma_{i=0}^{n}(\alpha_i \cdot \Delta B_i))$ is a facial animation driven by the blendshape, $\alpha_i$ is the i-th blendshape weight, and T is a head rigid rotation matrix. For example, the base model may be modified by the facial blendshapes and blendshape weights to animate the base model.

In an example, when certain facial expressions are detected, body animation may be done with an associated avatar body animation. The body animation may be designed as a skeleton animation or as a blendshape animation. For blendshape animation, an equation similar to that above may be used to animate both the face and the body:

$$B_* = T \cdot \left( B_0 + \sum_{i=0}^{n} (\alpha_i \cdot \Delta B_i) \right) + \sum_{j=0}^{m} (\beta_j \cdot \Delta D_j)$$

Where the repeated variables have the same purposes as those defined for the equation above, and $(\beta_j \cdot \Delta D_j)$ is a linear combination of body animation. In an example, the blendshape animation for body animation may be used when a body action is simple or does not interfere or interact with a face animation.

The method 300 may include blending the avatar face and the body of the avatar into a blended avatar. The blended avatar may be animated. Blending the avatar face and the body of the avatar may include animating the body of the avatar and the avatar face together using common blendshapes.

In another example, skeleton animation may be used to animate a body of an avatar. The skeleton animation may be used when a model mesh or body action is complex or interferes or interacts with a face animation. Skeleton animation may include a bone and joint structure. For example, bones may be connected by joints and a joint may be defined by its position (p), orientation (Θ), and rotation (α) (e.g., in a triple (p,Θ,α)). A joint may be defined relative to a parent joint, or in a special joint case, an origin when the joint is a root joint. For example, in FIG. 2, base joint 206 may be a root joint and may be defined relative to an origin. Middle joint 208 may be defined relative to base joint 206, and end joint 210 may be defined relative to middle joint 208. A child joint may inherit the transformation of its parent joint. A joint orientation may be represented as rotation angles of each of three axes. In an example, a bone may be connected to two joints, one on each end of the bone. The bone length may include a weight of a vertex at the end of the bone. To animate a body using skeleton animation, a body action may include a sequence of key frames where a joint's transition, rotation angle, and timing may be determined and assigned.

A face animation and a body animation (blendshape or skeleton) may be combined, to make a combined animation. The face and body animations may be done concurrently or sequentially. For example, a sequence of n key frames of a wing flapping may be combined with a face smiling. The n key frames may include a smile weight as an interpolation coefficient of the key frames. Using the interpolation, a transition and rotation of each joint in the wing may be determined, and the wing may be animated using the bone and joint determinations.

Figure 4:
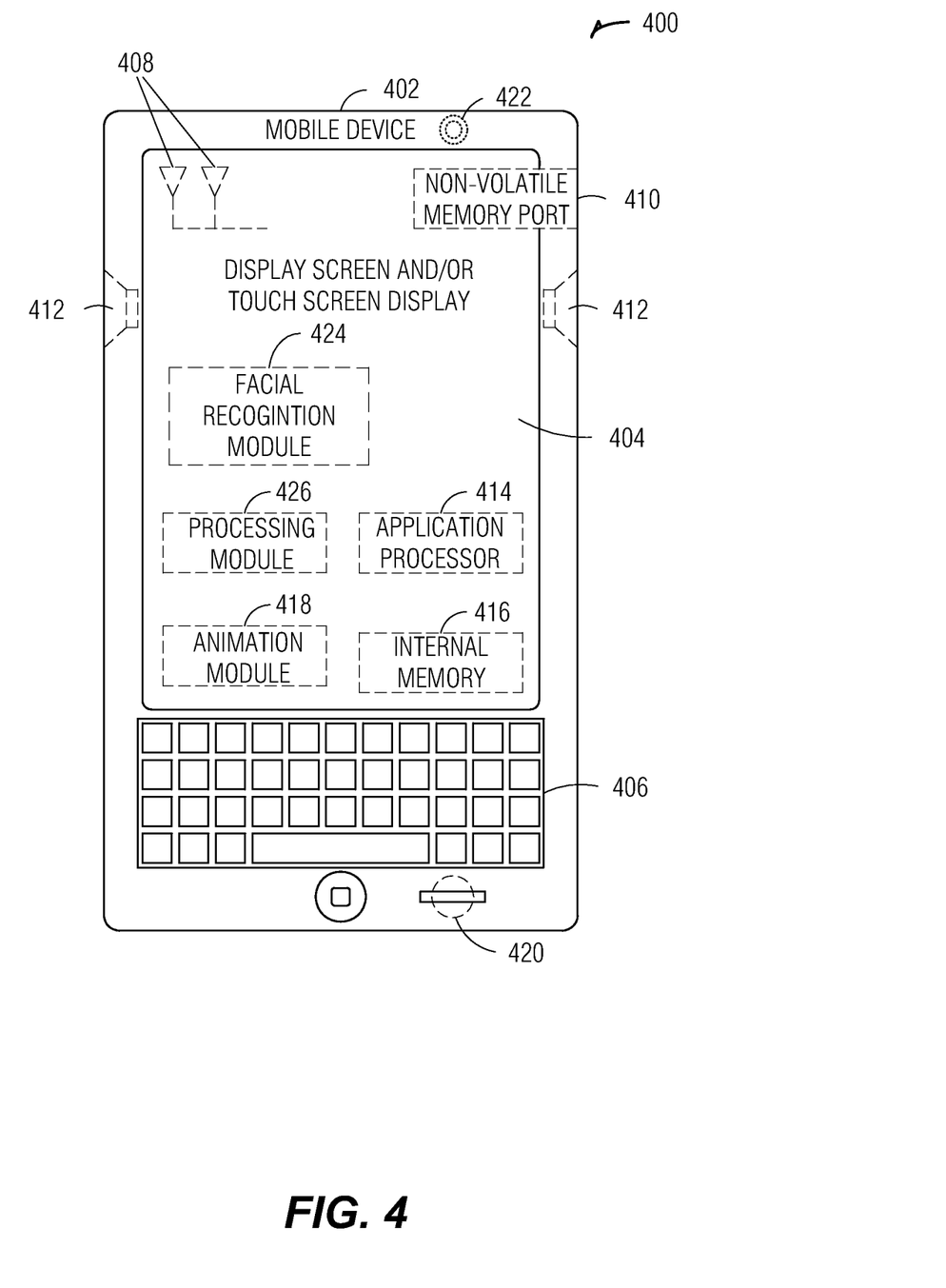
FIG. 4 is a diagram illustrating a mobile device on which the configurations and techniques described herein may be deployed, according to an embodiment.

FIG. 4 is a diagram illustrating a mobile device 400 on which the configurations and techniques described herein may be deployed, according to an embodiment. FIG. 4 provides an example illustration of a mobile device 400, such as a user equipment (UE), a mobile station (MS), a mobile wireless device, a mobile communication device, a tablet, a handset, or other type of mobile wireless computing device. The mobile device 400 may include one or more antennas 408 within housing 402 that are configured to communicate with a hotspot, base station (BS), an eNB, or other type of WLAN or WWAN access point. The mobile device may be configured to communicate using multiple wireless communication standards, including standards selected from 3GPP LTE, WiMAX, High Speed Packet Access (HSPA), Bluetooth, and Wi-Fi standard definitions. The mobile device 400 may communicate using separate antennas for each wireless communication standard or shared antennas for multiple wireless communication standards. The mobile device 400 may communicate in a WLAN, a WPAN, and/or a WWAN.

FIG. 4 also provides an illustration of a microphone 420 and one or more speakers 412 that may be used for audio input and output from the mobile device 400. A display screen 404 may be a liquid crystal display (LCD) screen, or other type of display screen such as an organic light emitting diode (OLED) display. The display screen 404 may be configured as a touch screen. The touch screen may use capacitive, resistive, or another type of touch screen technology. An application processor 414 and a graphics processor may be coupled to internal memory 416 to provide processing and display capabilities. A non-volatile memory port 410 may also be used to provide data input/output options to a user. The non-volatile memory port 410 may also be used to expand the memory capabilities of the mobile device 400. A keyboard 406 may be integrated with the mobile device 400 or wirelessly connected to the mobile device 400 to provide additional user input. A virtual keyboard may also be provided using the touch screen. A camera 422 located on the front (display screen) side or the rear side of the mobile device 400 may also be integrated into the housing 402 of the mobile device 400.

In an example, the mobile device 400 may include a facial recognition module 424, a processing module 426, or an animation module 418. In an example, the mobile device 400 may include an image capture device, such as the camera 422. The image capture device may capture a series of images of a face. The facial recognition module 424 may compute facial motion data for each of the images in the series of images. In an example, the facial recognition module 424 may compute facial motion data during a specific time frame, such as over a period of milliseconds, seconds, minutes, etc.

In an example, the processing module 426 may identify an avatar body animation based on the facial motion data. The processing module 426 may determine movement of a specified landmark point on the face and identify the avatar body animation based on the movement of the specified landmark. For example, an avatar body animation of waving an arm may be triggered by a landmark point on a mouth moving, such as when smiling. The movement of the specified landmark may be a user defined movement of the specified landmark. In another example, the processing module 426 may determine a lack of movement of the face in the series of images and identify the avatar body animation based on the lack of movement. For example, if the face does not move for a predetermined amount of time, an avatar body animation of a tail wagging may commence. The avatar body animation may be used to get a user's attention when the face does not move for the predetermined amount of time to get the user to reengage. The processing module 426 may identify the avatar body animation after receiving an indication to enter a body animation mode. In an example, the indication may be a user indication, an application initiation indication, an idle indication (e.g., when a lack of movement is determined), a specified avatar selection indication (e.g., when an avatar that has a body that may be animated is selected), etc.

The animation module 418 may animate a body of an avatar using the avatar body animation, wherein the body of the avatar includes a plurality of parts of the avatar connected to an avatar face. In an example, the avatar body animation may be a user defined avatar body animation, such as an avatar body animation selected from a list, drawn by a user on a touchscreen, drawn by a user with an input device, downloaded from a server, etc. In another example, the animation module 418 may animate an avatar face using the facial motion data from the facial recognition module 424. The animation module 418 may animate the body of the avatar using the avatar face animation. For example, body of the avatar may be animated to wave a hand when the avatar face animation shows the avatar smiling. Examples may include corresponding animations, such as the hand waving and smiling, or animations that are selected to be used together by the processing module 426 or by a user (e.g., the animations may be, but are not necessarily related by emotion or action). For example, the body of the avatar may be animated to flap wings when the avatar face animation shows the avatar winking In another example, the animation module 418 may animate the avatar face based on properties of the body animation. In this example, any of the animation techniques described above may be used in reverse (e.g., animate the avatar face to smile when the avatar body animation is to wave a hand). The animation module 418 may use properties of the facial animation to animate the body of the avatar. The properties of the facial animation may include a degree, duration, intensity, size, or length of the facial animation, such as size of a smile, duration of eye blinking, intensity of head shaking, etc. The animation module 418 may animate the body of the avatar using these properties, such as flapping wings for the same duration of eye blinking, or wagging a tail for the same intensity of head shaking, etc.

In another example, the animation module 418 may animate parts of a body, such as parts of a tail, wing, leg, arm, etc. For example, the animation module 418 may animate a second part of the body relative to a first part of the body. The animation may include a first weighted value. For example, the middle of a tail may be animated to move relative to a base portion of the tail. The animation module 418 may animate a third part of the body relative to the second part of the body using a second weighted value, wherein the second weighted value is less than the first weighted value. For example, the tip of the tail may be animated relative to the middle of the tail, and the weight for the tip animation relative to the middle may be less than the weight for the middle animation relative to the base.

In another example, the animation module 418 may animate a blended avatar. The blended avatar may include the avatar face and the body of the avatar blended by the processing module 426.

Figure 5:
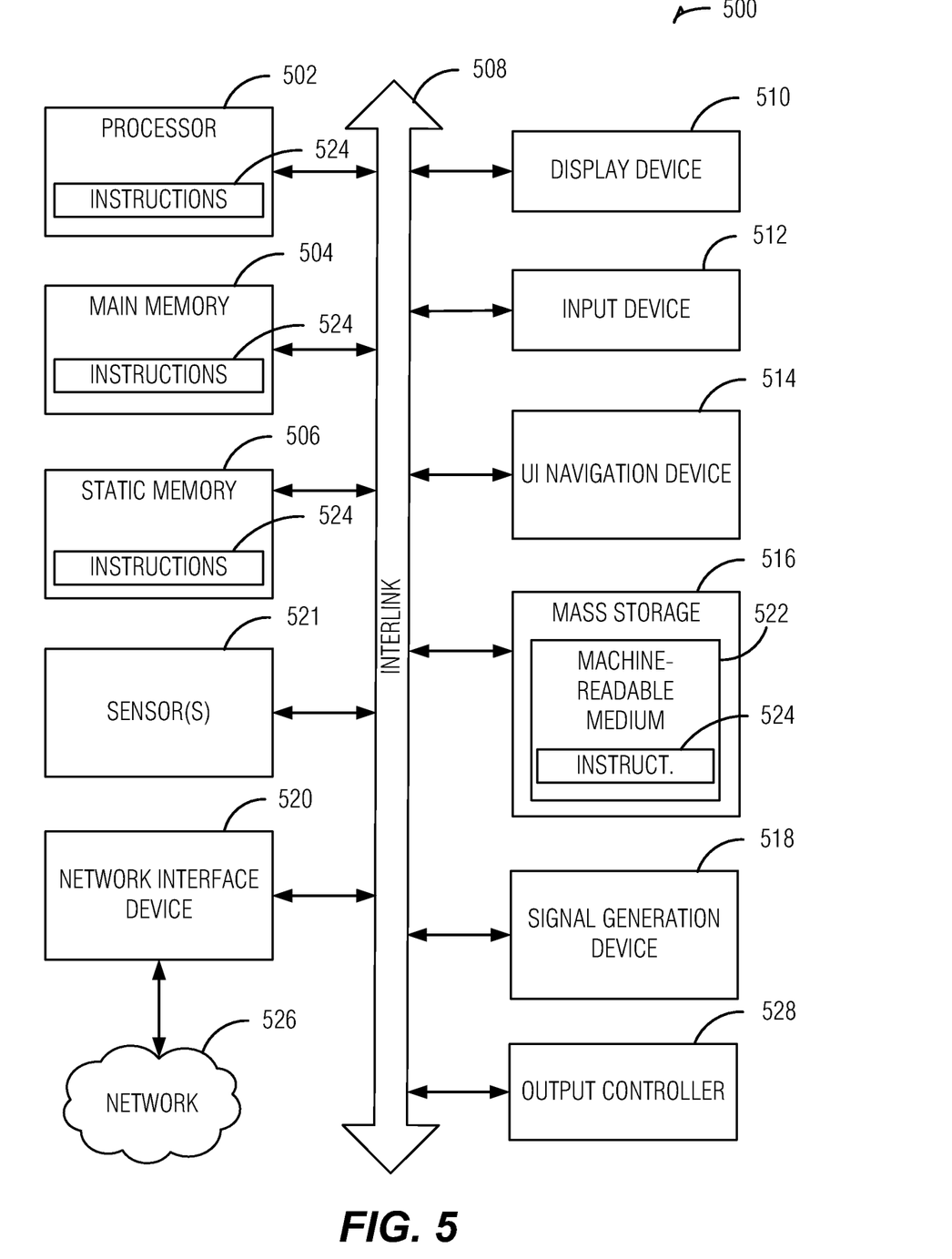
FIG. 5 is a block diagram of a machine upon which any one or more of the techniques (e.g., methodologies) discussed herein may perform, according to an embodiment.

FIG. 5 is a block diagram of a machine 500 upon which any one or more of the techniques (e.g., methodologies) discussed herein may perform, according to an embodiment. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 includes the subject matter embodied by a system for facial gesture driven body animation comprising: an image capture device to capture a series of images of a face, a facial recognition module to compute facial motion data for each of the images in the series of images, a processing module to identify an avatar body animation based on the facial motion data, and an animation module to animate a body of an avatar using the avatar body animation, wherein the body of the avatar includes a plurality of parts of the avatar connected to an avatar face.

In Example 2, the subject matter of Example 1 can optionally include wherein to identify the avatar body animation, the processing module is to determine movement of a landmark point on the face and identify the avatar body animation based on the movement of the landmark.

In Example 3, the subject matter of one or any combination of Examples 1-2 can optionally include wherein the movement of the landmark is a user defined movement of the landmark.

In Example 4, the subject matter of one or any combination of Examples 1-3 can optionally include wherein to identify the avatar body animation, the processing module is to determine a lack of movement of the face in the series of images and identify the avatar body animation based on the lack of movement.

In Example 5, the subject matter of one or any combination of Examples 1-4 can optionally include wherein the avatar body animation is a user defined avatar body animation.

In Example 6, the subject matter of one or any combination of Examples 1-5 can optionally include wherein the processing module is to identify the avatar body animation after receiving a user indication to enter a body animation mode.

In Example 7, the subject matter of one or any combination of Examples 1-6 can optionally include wherein the animation module is to animate the avatar face using the facial motion data.

In Example 8, the subject matter of one or any combination of Examples 1-7 can optionally include wherein the processing module is to blend the avatar face and the body of the avatar into a blended avatar, and wherein the animation module is to animate the blended avatar.

In Example 9, the subject matter of one or any combination of Examples 1-8 can optionally include wherein to animate the body of the avatar, the animation module is to animate the body of the avatar in response to the animation of the avatar face.

In Example 10, the subject matter of one or any combination of Examples 1-9 can optionally include wherein the animation module is to animate the avatar face based on properties of the body animation.

In Example 11, the subject matter of one or any combination of Examples 1-10 can optionally include wherein the animation module is to animate the body of the avatar based on properties of the facial animation.

In Example 12, the subject matter of one or any combination of Examples 1-11 can optionally include wherein to animate the body of the avatar, the animation module is to animate a second part of the body relative to a first part of the body.

In Example 13, the subject matter of one or any combination of Examples 1-12 can optionally include wherein to animate the second part of the body relative to the first part of the body, the animation module is to use a first weighted value.

In Example 14, the subject matter of one or any combination of Examples 1-13 can optionally include wherein to animate the body of the avatar, the animation module is to animate a third part of the body relative to the second part of the body using a second weighted value, wherein the second weighted value is less than the first weighted value.

In Example 15, the subject matter of one or any combination of Examples 1-14 can optionally include wherein to animate the body of the avatar, the animation module is to use a base model, a set of facial blendshapes, a set of blendshape weights, a head rigid rotation matrix, and a set of linear combinations of body animations.

In Example 16, the subject matter of one or any combination of Examples 1-15 can optionally include wherein to animate the body of the avatar, the animation module is to add a linear combination of the set of facial blendshapes and the set of blendshape weights to the base model, multiply by the head rigid rotation matrix, and add to the linear combinations of body animations.

Example 17 includes the subject matter embodied by a method for facial gesture driven body animation comprising: capturing a series of images of a face, computing facial motion data for each of the images in the series of images, identifying an avatar body animation based on the facial motion data, and animating a body of an avatar using the avatar body animation, wherein the body of the avatar includes a plurality of parts of the avatar connected to an avatar face.

In Example 18, the subject matter of Example 17 can optionally include wherein identifying the avatar body animation includes determining movement of a landmark point on the face and identifying the avatar body animation based on the movement of the landmark.

In Example 19, the subject matter of one or any combination of Examples 17-18 can optionally include wherein the movement of the landmark is a user defined movement of the landmark.

In Example 20, the subject matter of one or any combination of Examples 17-19 can optionally include wherein identifying the avatar body animation includes determining a lack of movement of the face in the series of images and identifying the avatar body animation based on the lack of movement.

In Example 21, the subject matter of one or any combination of Examples 17-20 can optionally include wherein the avatar body animation is a user defined avatar body animation.

In Example 22, the subject matter of one or any combination of Examples 17-21 can optionally include further comprising receiving a user indication to enter a body animation mode, and wherein identifying the avatar body animation includes identifying the avatar body animation after receiving the user indication.

In Example 23, the subject matter of one or any combination of Examples 17-22 can optionally include further comprising animating the avatar face using the facial motion data.

In Example 24, the subject matter of one or any combination of Examples 17-23 can optionally include further comprising blending the avatar face and the body of the avatar into a blended avatar, and animating the blended avatar.

In Example 25, the subject matter of one or any combination of Examples 17-24 can optionally include wherein animating the body of the avatar includes animating the body of the avatar in response to animating the avatar face.

In Example 26, the subject matter of one or any combination of Examples 17-25 can optionally include wherein animating the avatar face includes animating the avatar face based on properties of the body animation.

In Example 27, the subject matter of one or any combination of Examples 17-26 can optionally include wherein animating the body of the avatar includes animating the body of the avatar based on properties of the facial animation.

In Example 28, the subject matter of one or any combination of Examples 17-27 can optionally include wherein animating the body of the avatar includes animating a first part of the body and animating a second part of the body relative to the first part of the body.

In Example 29, the subject matter of one or any combination of Examples 17-28 can optionally include wherein animating the second part of the body includes animating the second part of the body using a first weighted value.

In Example 30, the subject matter of one or any combination of Examples 17-29 can optionally include wherein animating the body of the avatar includes animating a third part of the body relative to the second part of the body using a second weighted value, wherein the second weighted value is less than the first weighted value.

In Example 31, the subject matter of one or any combination of Examples 17-30 can optionally include wherein animating the body of the avatar includes animating the body using a base model, a set of facial blendshapes, a set of blendshape weights, a head rigid rotation matrix, and a set of linear combinations of body animations.

In Example 32, the subject matter of one or any combination of Examples 17-31 can optionally include wherein animating the body of the avatar includes adding a linear combination of the set of facial blendshapes and the set of blendshape weights to the base model, multiplying by the head rigid rotation matrix, and adding to the linear combinations of body animations.

Example 33 includes at least one machine-readable medium including instructions for receiving information, which when executed by a machine, cause the machine to perform any of the methods of Examples 17-32.

Example 34 includes an apparatus comprising means for performing any of the methods of Examples 17-32.

Example 35 includes the subject matter embodied by a method for facial gesture driven body animation comprising: means for capturing a series of images of a face, means for computing facial motion data for each of the images in the series of images, means for identifying an avatar body animation based on the facial motion data, and means for animating a body of an avatar using the avatar body animation.

In Example 36, the subject matter of Example 35 can optionally include wherein the means for identifying the avatar body animation include means for determining movement of a landmark point on the face and identifying the avatar body animation based on the movement of the landmark.

In Example 37, the subject matter of one or any combination of Examples 35-36 can optionally include wherein the movement of the landmark is a user defined movement of the landmark.

In Example 38, the subject matter of one or any combination of Examples 35-37 can optionally include wherein the means for identifying the avatar body animation include means for determining a lack of movement of the face in the series of images and identifying the avatar body animation based on the lack of movement.

In Example 39, the subject matter of one or any combination of Examples 35-38 can optionally include wherein the avatar body animation is a user defined avatar body animation.

In Example 40, the subject matter of one or any combination of Examples 35-39 can optionally include further comprising means for receiving a user indication to enter a body animation mode, and wherein the means for identifying the avatar body animation include means for identifying the avatar body animation after receiving the user indication.

In Example 41, the subject matter of one or any combination of Examples 35-40 can optionally include further comprising means for animating an avatar face using the facial motion data.

In Example 42, the subject matter of one or any combination of Examples 35-41 can optionally include further comprising means for blending the avatar face and the body of the avatar into a blended avatar, and animating the blended avatar.

In Example 43, the subject matter of one or any combination of Examples 35-42 can optionally include wherein the means for animating the body of the avatar include means for animating the body of the avatar in response to animating the avatar face.

In Example 44, the subject matter of one or any combination of Examples 35-43 can optionally include wherein the means for animating the avatar face include means for animating the avatar face based on properties of the body animation.

In Example 45, the subject matter of one or any combination of Examples 35-44 can optionally include wherein the means for animating the body of the avatar include means for animating the body of the avatar based on properties of the facial animation.

In Example 46, the subject matter of one or any combination of Examples 35-45 can optionally include wherein the means for animating the body of the avatar include means for animating a first part of the body and means for animating a second part of the body relative to the first part of the body.

In Example 47, the subject matter of one or any combination of Examples 35-46 can optionally include wherein the means for animating the second part of the body include means for animating the second part of the body using a first weighted value.

In Example 48, the subject matter of one or any combination of Examples 35-47 can optionally include wherein the means for animating the body of the avatar include means for animating a third part of the body relative to the second part of the body using a second weighted value, wherein the second weighted value is less than the first weighted value.

In Example 49, the subject matter of one or any combination of Examples 35-48 can optionally include wherein the means for animating the body of the avatar include means for animating the body using a base model, a set of facial blendshapes, a set of blendshape weights, a head rigid rotation matrix, and a set of linear combinations of body animations.

In Example 50, the subject matter of one or any combination of Examples 35-49 can optionally include wherein the means for animating the body of the avatar include means for adding a linear combination of the set of facial blendshapes and the set of blendshape weights to the base model, multiplying by the head rigid rotation matrix, and adding to the linear combinations of body animations.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations.

What is claimed is:

1. A non-transitory computer-readable storage device having stored thereon instructions which, when executed by one or more processors, cause a computing device to:
receive a plurality of images from a camera, at least one of the plurality of images including an image of a face of a user;
detect a facial expression of the face of the user using the at least one of the plurality of images;
responsive to receipt of a user input selection to enter a body animation mode, identify an avatar body animation based on the facial expression of the user, wherein the identified avatar body animation includes animation of one or more avatar body parts other than a face of the avatar; and
trigger animation of at least an arm or a leg of an avatar based on the identified avatar body animation, wherein the avatar corresponds to the user.

2. The non-transitory computer-readable storage device of claim 1, wherein the instructions comprise instructions to cause the computing device to:
cause animation of an avatar face of the avatar based at least in part on the facial expression.

3. The non-transitory computer-readable storage device of claim 1, wherein the instructions comprise instructions to cause the computing device to:
detect a change of the facial expression; and
trigger an animation of the avatar based on the detected change.

4. A method, comprising:
receiving a plurality of images from a camera, at least one of the plurality of images including an image of a face of a user;
detecting a facial expression of the face of the user using the at least one of the plurality of images;
responsive to receipt of a user input selection to enter a body animation mode, identifying an avatar body animation based on the facial expression of the user, the identified avatar body animation including animation of one or more avatar body parts other than a face of the avatar; and
triggering animation of at least an arm or a leg of an avatar based on the identified avatar body animation, wherein the avatar corresponds to the user.

5. The method of claim 4, comprising:
causing animation of an avatar face of the avatar based at least in part on the detected facial expression.

6. The method of claim 4, comprising:
detecting a change of the facial expression; and
triggering an animation of the avatar based on the detected change.

7. A system, comprising:
means for receiving a plurality of images from a camera, at least one of the plurality of images including an image of a face of a user;
means for detecting a facial expression of the face of the user using the at least one of the plurality of images;
means for identifying, responsive to receipt of a user input selection to enter a body animation mode, an avatar body animation based on the facial expression of the user, wherein the identified avatar body animation includes animation of one or more avatar body parts other than a face of the avatar; and
means for triggering animation of at least an arm or a leg of an avatar based on the identified avatar body animation, wherein the avatar corresponds to the user.

8. The system of claim 7, further comprising:
means for causing animation of an avatar face of the avatar based at least in part on the detected facial expression.

9. The system of claim 7, further comprising:
means for detecting a change of the facial expression; and
means for triggering an animation of the avatar based on the detected change.

10. A system, comprising:
a non-transitory computer-readable storage device having stored thereon instructions; and
one or more processors to execute the instructions to:
receive a plurality of images from a camera, at least one of the plurality of images including an image of a face of a user;
detect a facial expression of the face of the user using the at least one of the plurality of images;
responsive to receipt of a user input selection to enter a body animation mode, identify an avatar body animation based on the facial expression of the user, wherein the identified avatar body animation includes animation of one or more avatar body parts other than a face of the avatar; and
trigger animation of at least an arm or a leg of an avatar based on the identified avatar body animation, wherein the avatar corresponds to the user.

11. The system of claim 10, further comprising the camera.

12. The system of claim 10, further comprising:
a microphone; and
at least one speaker.

13. The system of claim 10, further comprising a wireless interface.

14. The system of claim 10, further comprising a display.

15. The system of claim 14, wherein the one or more processors are to execute the instructions to cause the avatar to appear animated on the display.

* * * * *